US011303368B2

(12) United States Patent
Elmasry et al.

(10) Patent No.: US 11,303,368 B2
(45) Date of Patent: Apr. 12, 2022

(54) SYSTEM AND METHOD FOR SAME-CHANNEL OUT-OF-BAND SPECTRUM SENSING FOR COMMAND AND CONTROL (C2) COMMUNICATIONS TO UNMANNED AIRCRAFT SYSTEMS (UAS)

(71) Applicant: Rockwell Collins, Inc., Cedar Rapids, IA (US)

(72) Inventors: George F. Elmasry, San Marcos, CA (US); Jason Thompson, Vinton, IA (US); George Tyler Barney, North Liberty, IA (US); Boe A. Svatek, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 46 days.

(21) Appl. No.: 17/024,279

(22) Filed: Sep. 17, 2020

(65) Prior Publication Data

US 2022/0085900 A1    Mar. 17, 2022

Related U.S. Application Data

(63) Continuation-in-part of application No. 17/018,019, filed on Sep. 11, 2020.

(51) Int. Cl.
*H04B 17/345* (2015.01)
*H04B 7/185* (2006.01)
(Continued)

(52) U.S. Cl.
CPC ....... *H04B 17/345* (2015.01); *H04B 7/18506* (2013.01); *H04W 4/44* (2018.02);
(Continued)

(58) Field of Classification Search
CPC ... H04B 17/345; H04B 7/18506; H04W 4/44; H04W 16/16; H04W 24/10; H04W 28/16; H04W 84/105
See application file for complete search history.

(56) References Cited

U.S. PATENT DOCUMENTS 5,123,112 A    6/1992 Choate
5,212,804 A    5/1993 Choate
(Continued)

FOREIGN PATENT DOCUMENTS

CN    103209037 B    4/2015
CN    109889288 A    6/2019
(Continued)

OTHER PUBLICATIONS https://newjerseywireless.org/feed-rss/ericsson-calls-out-dynamic-spectrum-sharing-as-key-to-nationwide-5g-coverage/, "Ericsson calls out dynamic spectrum sharing as key to nationwide 5G coverage", Ericsson, First Printed Aug. 5, 2020, 5 pages.
(Continued)

*Primary Examiner* — Ashley Shivers
(74) *Attorney, Agent, or Firm* — Suiter Swantz pc llo (57) ABSTRACT

A command and control (C2) radio system configured for same-channel out-of-band sensing is disclosed. In embodiments, the radio system (e.g., an air radio system (ARS) aboard an unmanned aircraft system (UAS) or a ground radio station (GRS)) scans its switching back to the appropriate operating frequency before the next subframe starts. The radio system processes the collected energy samples to determine minimum and mean operating frequencies for idle subframes and slots where a preamble is not detected. The radio system uses idle frames to scan sensing frequencies assigned by a central server of the C2 link system, collecting spectral energy sources during the idle timeslots and energy levels, thereby identifying the level of interference on the
(Continued)

assigned frequency (e.g., due to noise or interfering signals) and hypothesizes whether the detected interference is tolerable or precludes current use of the assigned signal in the vicinity of the radio system.

15 Claims, 5 Drawing Sheets

(51) Int. Cl.
  H04W 4/44 (2018.01)
  H04W 28/16 (2009.01)
  H04W 24/10 (2009.01)
  H04W 16/16 (2009.01)
  H04W 84/10 (2009.01)

(52) U.S. Cl.
  CPC ........... *H04W 16/16* (2013.01); *H04W 24/10* (2013.01); *H04W 28/16* (2013.01); *H04W 84/105* (2013.01)

(56) References Cited

U.S. PATENT DOCUMENTS

| | | | |
|---|---|---|---|
| 7,979,200 | B2 | 7/2011 | Bay et al. |
| 8,451,751 | B2 | 5/2013 | Challapali et al. |
| 8,494,546 | B2 | 7/2013 | Hu |
| 8,654,771 | B1 | 2/2014 | Singh et al. |
| 8,976,762 | B2 | 3/2015 | Mantis et al. |
| 9,237,043 | B1 | 1/2016 | Beals et al. |
| 9,285,463 | B1* | 3/2016 | Freeman ............ F41H 13/0043 |
| 9,326,291 | B2 | 4/2016 | Luo et al. |
| 9,648,589 | B2 | 5/2017 | Weaver et al. |
| 9,872,182 | B2 | 1/2018 | Smith et al. |
| 9,986,440 | B2 | 5/2018 | Guvenc |
| 10,264,463 | B2 | 4/2019 | McHenry et al. |
| 10,477,549 | B2 | 11/2019 | Watts |
| 10,645,627 | B2 | 5/2020 | Abdul et al. |
| 10,823,843 | B1* | 11/2020 | Kendra ................. G01S 13/589 |
| 2012/0120892 | A1 | 5/2012 | Freda et al. |
| 2012/0134328 | A1 | 5/2012 | Gauvreau et al. |
| 2017/0055179 | A1 | 2/2017 | Radunovic et al. |
| 2017/0215178 | A1 | 7/2017 | Kim et al. |
| 2017/0215220 | A1 | 7/2017 | Kim et al. |
| 2017/0325221 | A1 | 11/2017 | Jalali |
| 2018/0160433 | A1 | 6/2018 | Kim et al. |
| 2018/0262289 | A1* | 9/2018 | Li ....................... H04W 52/243 |
| 2019/0054937 | A1 | 2/2019 | Graetz et al. |
| 2019/0230671 | A1 | 7/2019 | Kim et al. |
| 2020/0120458 | A1 | 4/2020 | Aldana et al. |
| 2020/0187013 | A1 | 6/2020 | Mody et al. |
| 2020/0245167 | A1 | 7/2020 | Kleinbeck et al. |

FOREIGN PATENT DOCUMENTS

| | | |
|---|---|---|
| CN | 110392350 A | 10/2019 |
| CN | 110602758 A | 12/2019 |
| EP | 2837223 A4 | 1/2016 |
| GB | 2461724 B | 2/2011 |
| KR | 1020150095008 A | 8/2015 |
| KR | 1020170105559 A | 9/2017 |
| KR | 101836480 B1 | 3/2018 |
| KR | 101949709 B1 | 2/2019 |

OTHER PUBLICATIONS

Lin, Y. et al., "Dynamic Spectrum Interaction of UAV Flight Formation Communication with Priority: A Deep Reinforcement Learning Approach," in IEEE Transactions on Cognitive Communications and Networking, doi: 10.1109/TCCN.2020.2973376, Downloaded Feb. 14, 2020, 12 pages.

U.S. Appl. No. 17/024,309, filed Sep. 17, 2020, entitled System and Method for Spectrum Situational Awareness via Server-Based Fusion in a Command and Control (C2) Link System for Unmanned Aircraft Systems (UAS).

U.S. Appl. No. 17/024,266, filed Sep. 17, 2020, entitled System and Method for Generating Control and Non-Payload Communication (CNPC) Congestion Metrics at a Ground Control Station.

U.S. Appl. No. 17/018,019, filed Sep. 11, 2020, entitled System and Method for Adaptive Extension of Command and Control (C2) Backhaul Network for Unmanned Aircraft Systems (UAS).

* cited by examiner

SYSTEM AND METHOD FOR SAME-CHANNEL OUT-OF-BAND SPECTRUM SENSING FOR COMMAND AND CONTROL (C2) COMMUNICATIONS TO UNMANNED AIRCRAFT SYSTEMS (UAS)

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

Concurrently filed U S. Patent Application entitled SYSTEM AND METHOD FOR SPECTRUM SITUATIONAL AWARENESS VIA SERVER-BASED FUSION IN A COMMAND AND CONTROL (C2) LINK SYSTEM FOR UNMANNED AIRCRAFT SYSTEMS (UAS), application Ser. No. 17/024,309;

Concurrently filed U.S. Patent Application entitled SYSTEM AND METHOD FOR GENERATING CONTROL AND NON-PAYLOAD COMMUNICATION (CNPC) CONGESTION METRICS AT A GROUND CONTROL STATION, application Ser. No. 17/024,266;

and U.S. Patent Application entitled SYSTEM AND METHOD FOR ADAPTIVE EXTENSION OF COMMAND AND CONTROL (C2) BACKHAUL NETWORK FOR UNMANNED AIRCRAFT SYSTEMS (UAS), application Ser. No. 17/018,019, filed Sep. 11, 2020.

Said U.S. patent application Ser. No. 17/024,309, 17/024,266, and 17/018,019 are herein incorporated by reference in their entirety.

BACKGROUND

Traffic and operations management for unmanned aircraft systems (UAS; also unmanned aerial vehicles (UAV)) may be achieved by private wireless networks using specialized control and non-payload communications (CNPC) waveforms over aviation spectrum bands. For example, airborne UAS may carry onboard CNPC-based air radio systems (ARS) while ground-based control facilities maintain CNPC-based ground radio stations (GRS). A GRS may establish point-to-multipoint links to multiple ARS (e.g., multiple ARS operating within a coverage area dedicated to the GRS or within its transmission range) based on spectrum resources (e.g., bandwidth) assigned to the GRS. For example, the GRS may maintain command and control (C2) links to each ARS operating within its coverage area, via which the GRS may maintain spatial separation between ARS or prevent an ARS from entering dangerous or geofenced areas via control input submitted via the C2 link to the ARS operator or directly to the ARS itself. However, careless spectrum reuse may lead to self-interference (e.g., where a CNPC signal is interfered with by another CNPC signal from within the same C2 link system, as opposed to external interference, where a competing CNPC system may be operating on the same frequency within the same vicinity).

Also important to effective traffic management is how spectrum resources assigned to each GRS are shared by the ARS operating within the coverage area of that GRS. If, for example, the number of ARS operating within the coverage area at any given time is limited, the GRS will be able to manage the limited amount of traffic without congestion. As the coverage area becomes more and more crowded by operating UAS, however, a CNPC-based operating environment (which may include multiple GRS and their respective coverage areas) must be able to manage system capacity and increase capacity where needed. For example, dynamic spectrum access (DSA) may provide valuable opportunities for efficiently using and reusing operating frequencies within the CNPC operational bands. However, effective use of DSA to find spectrum use and reuse opportunities requires robust spectrum sensing capabilities throughout the CNPC operating environment.

An intuitive approach to increasing spectrum sensing capacity is to add commercial off the shelf (COTS) hardware-based sensors to every ARS and GRS. However, this approach requires hardware upgrades to the system. Further, operating UAS may operate under size, weight, and power (SWaP) restrictions that may make it impractical or otherwise not feasible to add additional hardware.

SUMMARY

A command and control (C2) communications device is disclosed. In embodiments, the C2 communications device includes a radio modem for selecting one or more operating frequencies (e.g., scanning frequencies) from a collection of possible frequencies. The C2 device includes a control and non-payload communications (CNPC) compatible receiver including antenna elements for scanning the operating frequencies and receiving, at one or more scanning frequencies, C2 message subframes transmitted by a source of the C2 link system (e.g., an air radio system (ARS) aboard an unmanned aircraft system (UAS) or a ground radio system (GRS)). The subframe includes uplink portions (e.g., for ground-to-air communications) and downlink portions (e.g., for air-to-ground communications). The receiver identifies the start of an uplink portion or downlink portion and, within the identified portion, the start of an individual slot within the subframe. The receiver determines whether the identified slot includes an acquired preamble; if the preamble is acquired, the receiver proceeds to receive the C2 message normally. If the identified slot does not include an acquired preamble, the radio modem switches the receiver to an assigned frequency for same-channel out-of-band spectrum sensing. At the assigned frequency, the receiver collects a set of spectral energy samples (e.g., a set of N energy samples integrated over the antenna elements, each sample associated with a sample period $T_s$). Once the energy samples are collected, the radio modem switches the receiver back to the scanning frequency. The C2 device includes control processors for processing the collected set of energy samples and thereby determining a minimum energy level (e.g., noise floor) and mean energy level of the assigned frequency. Based on the noise floor and mean energy level, the control processors identify an interference level at the assigned frequency.

In some embodiments, the C2 device is embodied in an ARS aboard a UAS, and identifies uplink slots which may be used for spectrum sensing if no preamble is acquired.

In some embodiments, the C2 device is embodied in a GRS and identifies downlink slots which may be used for spectrum sensing if no preamble is acquired.

In some embodiments, the assigned sensing frequency is assigned by a centralized spectrum arbitrator of the C2 link system. The receiver forwards the determined noise floor and mean energy level to the spectrum arbitrator for additional processing.

In some embodiments, the C2 device evaluates whether the determined interference level is tolerable or intolerable for C2 operations at the assigned sensing frequency, and forwards the evaluation to the spectrum arbitrator.

In some embodiments, the subframe includes a guard time indicating the end of the subframe; the C2 device selects N and $T_s$ such that the time window ($N \times T_s$) during which the set of spectral energy samples is collected concludes before the guard time.

In some embodiments, the C2 device further determines, by processing the collected set of N spectral energy samples, a standard deviation from the noise floor and a standard deviation from the mean energy level.

In some embodiments, the C2 device identifies an interfering signal (which may or may not be a constant-envelope signal) responsible for the determined interference level at the assigned sensing frequency.

A method for same-channel out-of-band spectrum sensing within a command and control (C2) link system is also disclosed. In embodiments, the method includes configuring a C2 radio system for scanning one or more operating frequencies (e.g., broadcast frequencies for sending and receiving C2 message traffic). The method includes receiving at least one sensing frequency assigned by a centralized spectrum arbitrator of the C2 link system. The method includes receiving subframes transmitted by a C2 source (e.g., an ARS or GRS), each subframe having uplink and downlink portions, by scanning the operating frequencies. The method includes identifying the start of an uplink or downlink slot within the subframe. The method includes determining whether the identified slot includes an acquired preamble (e.g., associated with transmitted C2 traffic). The method includes, if the slot does not include an acquired preamble, switching the C2 radio system to the assigned frequency for same-channel out-of-band spectrum sensing. The method includes collecting a set of N spectral energy samples at the assigned sensing frequency, each energy sample associated with a sample period $T_s$. The method includes returning the C2 radio system to the scanning frequency upon collection of the spectral energy samples at the assigned sensing frequency. The method includes identifying, via processing of the set of collected energy samples, a minimum energy level (e.g., noise floor), a mean energy level, and an interference level at the assigned sensing frequency (e.g., local to the C2 radio system). The method includes evaluating the determined interference level as tolerable or intolerable with respect to localized C2 operations over the assigned sensing frequency.

In some embodiments, the method includes forwarding the determined noise floor, mean energy level, interference level, and/or tolerance evaluation to the centralized spectrum arbitrator.

In some embodiments, the method includes configuring an air radio system (ARS) aboard an unmanned aircraft system (UAS) to scan the one or more operating frequencies, and identifying uplink slots (e.g., for ground-to-air communications with the ARS) within the subframe for spectrum sensing if no preamble is acquired.

In some embodiments, the method includes configuring a ground radio system (GRS) to scan the one or more operating frequencies, and identifying downlink slots (e.g., for air-to-ground communications with the GRS) within the subframe for spectrum sensing if no preamble is acquired.

In some embodiments, the method includes identifying a standard deviation from the determined noise floor and/or a standard deviation from the determined main energy level.

In some embodiments, the method includes selecting a number N of spectral energy samples to be collected and a sample period $T_s$ for each energy sample such that that the time window ($N \times T_s$) during which the set is collected concludes before the guard time indicating the end of the subframe.

In some embodiments, the method includes identifying an interfering signal associated with the determined interference level at the assigned sensing frequency.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a CNPC operating environment (e.g., command and control (C2) link system) incorporating software-based means for spectrum sensing throughout the operating environment, allowing for more robust DSA operations. For example, spectrum sensing operations may be implemented throughout the C2 link system via same-channel sensing, "same-channel" referring to the same hardware channel, e.g., using CNPC-based communications hardware of each GRS and ARS for spectrum sensing. The CNPC waveform already provides for same-channel in-band sensing (e.g., analyzing communications channel metrics to detect low signal-to-noise ratio (SNR), high bit error rate (BER), or other factors that may preclude use of an assigned frequency). Embodiments of the inventive concepts disclosed herein additionally provide for same-channel out-of-band sensing, whereby an ARS or GRS may take advantage of idle times (e.g., when the ARS/GRS is not otherwise receiving a C2 signal) to probe for other frequencies with the potential for use within a given area. Probing for additional useful frequencies may counter overly conservative spectrum reuse on the part of a centralized spectrum arbitrator, e.g., a centralized server configured for the management of spectrum resources throughout the C2 link system. Similarly, probing may enhance system capacity by reducing rippling throughout the C2 link system, e.g., when an operating frequency is found to be interfered with, and its use immediately reversed or discontinued.

Figure 1:
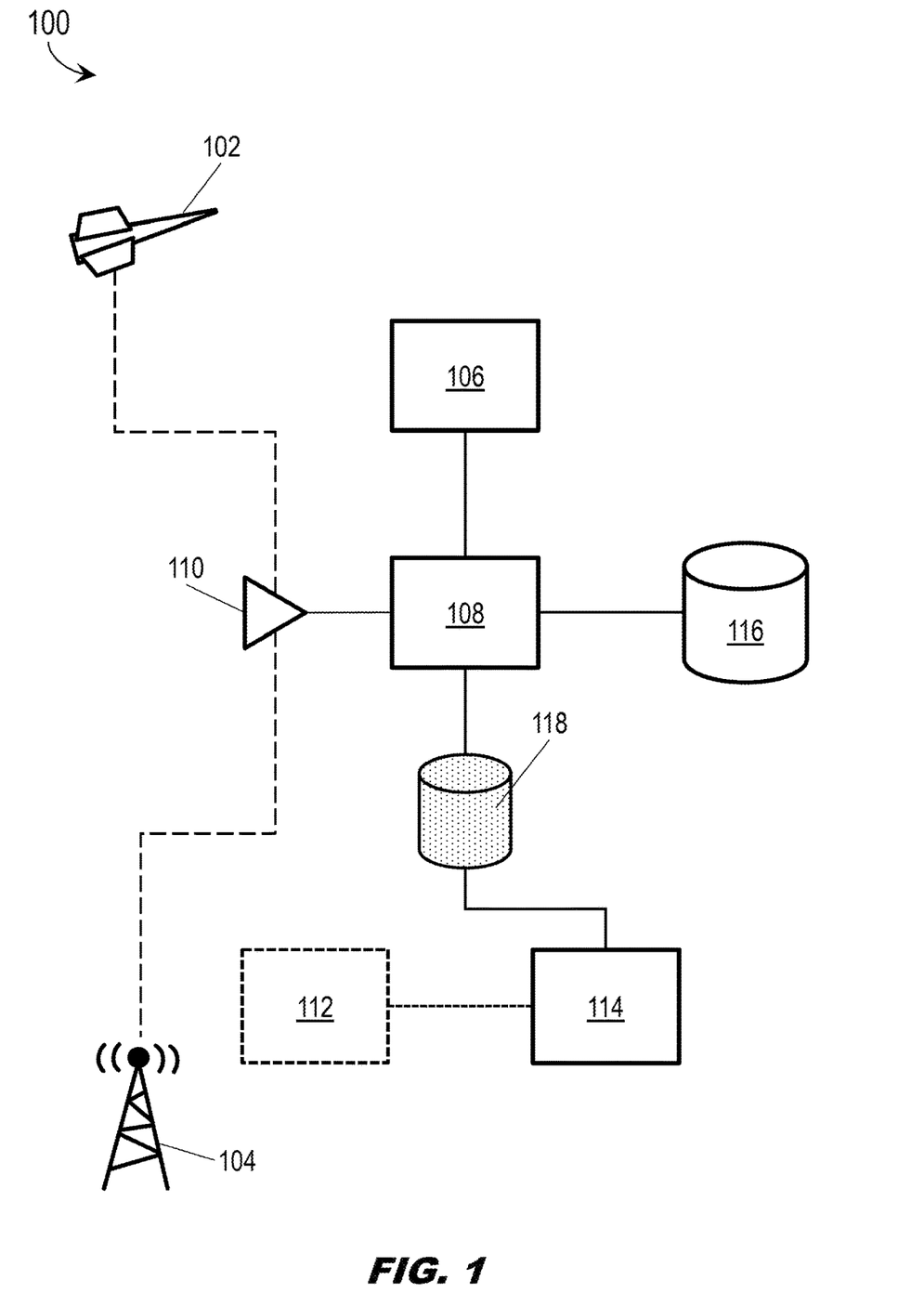
FIG. 1 is a block diagram illustrating a command and control (C2) operating environment incorporating same-channel out-of-band sensing according to example embodiments of this disclosure.

Referring to FIG. 1, a command and control (C2) link system 100 (e.g., command and non-payload communications (CNPC) operating environment) is disclosed. The C2 link system 100 may include air radio systems 102 (ARS), ground radio stations 104 (GRS), and, within the ARS 102 or GRS 104, C2 radio system components including a radio modem 106, CNPC transceiver 108, antenna elements 110, and control processors (e.g., local control processors 112 and centralized control processors 114, the local control processors responsible for processes local to the ARS/GRS). The C2 link system 100 may further include a centralized spectrum arbitrator 116 (e.g., central server). For example, the local control processors 112 may include distributed controller agents of each ARS 102/GRS 104, the distributed controller agents in communication with a centralized controller (e.g., centralized control processors 114) of the centralized spectrum arbitrator 116.

In embodiments, each GRS 104 may be assigned a particular coverage area and allocated a sub-band or group of operating frequencies by the centralized spectrum arbitrator 116. The GRS 104 may establish C2 links with, and thereby communicate with, ARS 102 operating within its coverage area by allocating an operating frequency and time slots to each ARS. While the ARS 102 operates within the coverage area of the GRS 104, the GRS and ARS may exchange C2 communications at the allocated frequency and during the allocated timeslots, e.g., uplink communications (where the GRS transmits and the ARS received) and downlink communications (where the ARS transmits and the GRS receives).

In embodiments, the ARS 102 may terminate the C2 link to the GRS 104, e.g., if the ARS enters the coverage area of a new GRS. Accordingly, the ARS 102 may, at any given time, be listening to (e.g., receiving) signals broadcast by multiple GRS 104, whether or not the ARS is within sufficient range of other GRS to receive a robust signal therefrom. As noted above, the GRS 104 may also be listening to multiple ARS 102 at any given time. The centralized spectrum arbitrator 116 may identify frequencies not currently in use within the coverage area of the GRS 104 and assign one or more said identified frequencies to the ARS 102 or the GRS for spectrum sensing.

In embodiments, the radio modem 106 may be configured for tuning the frequency of the CNPC transceiver 108. For example, the CNPC transceiver 108 may be switched between one or more operating frequencies, e.g., depending on which ARS 102 or GRS 104 is being listened to or scanned for a particular subframe or timeslot. When an idle timeslot is detected, and the ARS 102 or GRS 104 commences same-channel out-of-band spectrum sensing as described below, the radio modem 106 may tune the CNPC transceiver 108 to the sensing frequency assigned by the centralized spectrum arbitrator 116. When spectrum sensing operations conclude, the radio modem 106 may retune the CNPC transceiver 108 to its next regularly scheduled operating frequency before the beginning of the next subframe or slot.

Figure 2:
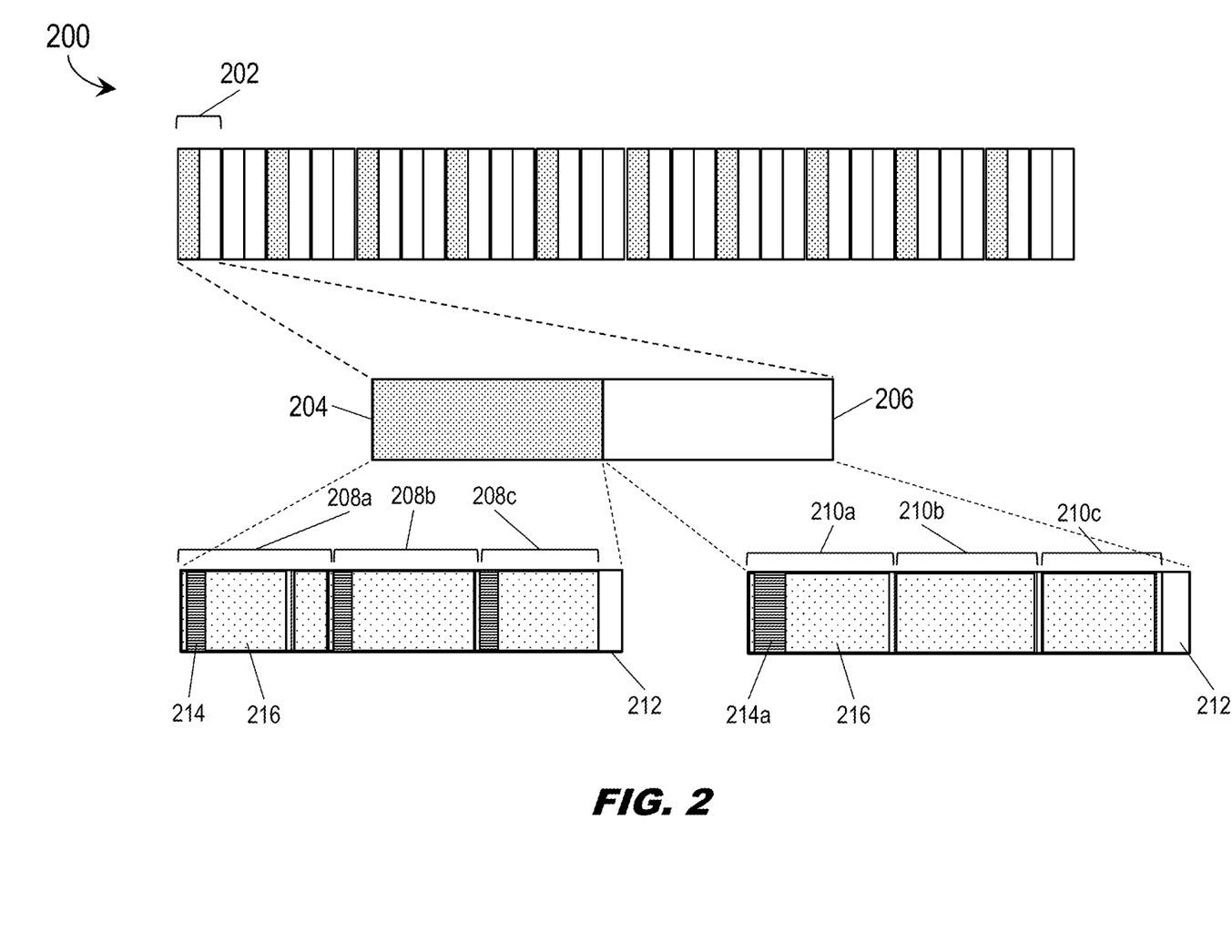
FIG. 2 is a diagrammatic illustration of control and non-payload communications (CNPC) scanning operations of the C2 operating environment of FIG. 1.

Referring also to FIG. 2, the CNPC frame 200 is disclosed. The CNPC frame 200 may include subframes 202, uplink portions 204, downlink portions 206, uplink slots 208a-c (e.g., timeslots), and downlink slots 210a-c.

In embodiments, the CNPC frame 200 (e.g., framing structure) may correspond to a time interval divided into subframes, e.g., a one-second interval divided into 20 subframes 202 of 50 msec each. Each subframe 202 may in turn be evenly divided into an uplink portion 204 and a downlink portion 206, each 25 msec. The uplink portion 204 and the downlink portion 206 may similarly be divided into individual uplink slots 208a-c and downlink slots 210a-c respectively, the uplink slots reserved for C2 transmissions by the GRS (104, FIG. 1) and received by the ARS (102, FIG. 1) and the downlink slots reserved for C2 transmissions by the ARS and received by the GRS. Accordingly, the GRS may perform scanning operations during the downlink slots 210*a-c*, and the ARS may perform scanning operations during the uplink slots 208*a-c*.

In embodiments, an uplink slot 208*a* may include a C2 signal transmitted by the GRS 104, or the uplink slot may be an idle slot. For example, an idle slot may indicate that the ARS 102 may be listening to a given GRS (e.g., other than the GRS 104 with which the ARS is currently linked) but may not be within sufficient range of the GRS to receive a robust signal. Similarly, the GRS 104 may listen to ARS 102 outside its effective range, resulting in idle downlink slots 210*a-c*.

In embodiments, the ARS 102 and GRS 104 may scan each subframe 202 (e.g., respectively the uplink portion 204 and the downlink portion 206) to identify the start of a subframe or the start of, respectively, an uplink slot 208*a-c* or downlink slot 210*a-c*. Similarly, the end of a subframe 202 (e.g., the end of the uplink portion 204 or downlink portion 206 thereof) may be indicated by a short period of guard time 212.

The uplink slot 208*a* may include a preamble 214, e.g., a short segment (e.g., 96 symbols for an uplink preamble, 128 symbols for a downlink preamble 214*a*) indicating the presence of C2 message content within the subsequent data segment 216. In the case of downlink slots 210*b-c*, the lack of a preamble may indicate that the current slot is idle. In embodiments, if the ARS 102 acquires a preamble 214, the ARS may perform normal functions associated with receiving the C2 message content within the subsequent data segment 216. If, however, the ARS 102 does not acquire a preamble for the uplink slot 210*a*, the ARS may commence same-channel out-of-band sensing (e.g., at the frequency assigned by the centralized spectrum arbitrator 116). Similarly, the GRS 104 may scan downlink slots 210*a-c*; if the downlink preamble 214*a* is detected, the GRS 104 may receive normally. If no downlink preamble 214*a* is required, however, the GRS 104 may perform same-channel out-of-band sensing (e.g., during the idle downlink slots 210*b-c*).

In embodiments, the ARS 102 (e.g., or GRS 104) may commence same-channel out-of-band spectrum sensing by first tuning its CNPC transceiver (108, FIG. 1) to the sensing frequency assigned by the centralized spectrum arbitrator (116, FIG. 1) via the radio modem (106, FIG. 1). For example, the CNPC transceiver 108, tuned to the assigned frequency, may collect spectral energy samples at the assigned frequency over the antenna elements 110. Each spectral energy sample may comprise an integration of spectral energy at the assigned frequency over the antenna elements 110 through a sample period $T_s$ (e.g., on the order of hundreds of microseconds).

In embodiments, the CNPC transceiver 108 may collect a series of N spectral energy samples of sample period $T_s$. For example, the control processors 112, 114 may select N and $T_s$ such that the collection of spectral energy samples is completed, and the CNPC transceiver 108 retuned to the proper operating frequency by the radio modem 106, before the start of the end-of-subframe guard time 212. For example, N and $T_s$ may be chosen (e.g., larger N and shorter $T_s$; smaller N and longer $T_s$) based on other factors, e.g., waveform characteristics and the particular hardware of the ARS 102 or GRS 104. For example, a larger N may be chosen to ensure the law of large numbers smooths out ambient noise spikes or other anomalies. A longer $T_s$; however, may increase the value of energy detection by providing a larger area under the integration curve of energy level over time, but may limit the number N of spectral energy samples that may be collected before the end of the subframe (202, FIG. 2). The collected spectral energy samples may be stored (118) for processing. In some embodiments, the spectral energy samples may be collected in dBm and normalized to dB by the control processors 112, 114.

In embodiments, processing of the collected spectral energy samples may be triggered by the retuning (e.g., by the radio modem 106) of the CNPC transceiver 108 to the appropriate operating frequency (e.g., scanning frequency) so that the ARS 102 or GRS 104 may resume CNPC scanning operations. For example, the collected spectral energy samples may be processed to calculate the following:

a minimum energy level $E_{min}$ (e.g., noise floor, additive white Gaussian noise (AWGN));

a mean or expected energy level $E_{mean}$;

a standard deviation $\sigma_{min}$ from the noise floor;

and a standard deviation $\sigma_{mean}$ from the main energy level.

In embodiments, the minimum energy level $E_{min}$ may be indicative of a sensed frequency unencumbered by interfering signals. Similarly, a mean energy level $E_{mean}$ close to $E_{min}$ may indicate the absence of an interfering signal at the sensed frequency. Increased deviation in the collected energy samples, however, may be associated with an interfering signal also using the sensed frequency (e.g., the stronger the signal energy, the larger the observed deviation).

In embodiments, the ARS 102 or GRS 104 may forward the collected energy samples and calculated energy levels (and deviations therefrom) to the centralized spectrum arbitrator 116 for detailed analysis via server fusion. The centralized spectrum arbitrator 116 may conduct a more detailed analysis of the collected spectrum energy samples as disclosed in concurrently filed application Ser. No.17/024,309, incorporated herein by reference in its entirety. However, the control processors 112, 114 of the ARS 102/GRS 104 may perform a limited amount of server-side sensor fusion operations, fusing the collected energy samples to calculate mean/ minimum energy levels as described above and thereby create a binary hypothesis as to the tolerability or intolerability of the interference level detected at the sensed frequency. For example, the spectral energy sensing process may inevitably result in a certain amount of energy detected over the antenna elements 110 due to, e.g., ambient noise.

Figure 3:
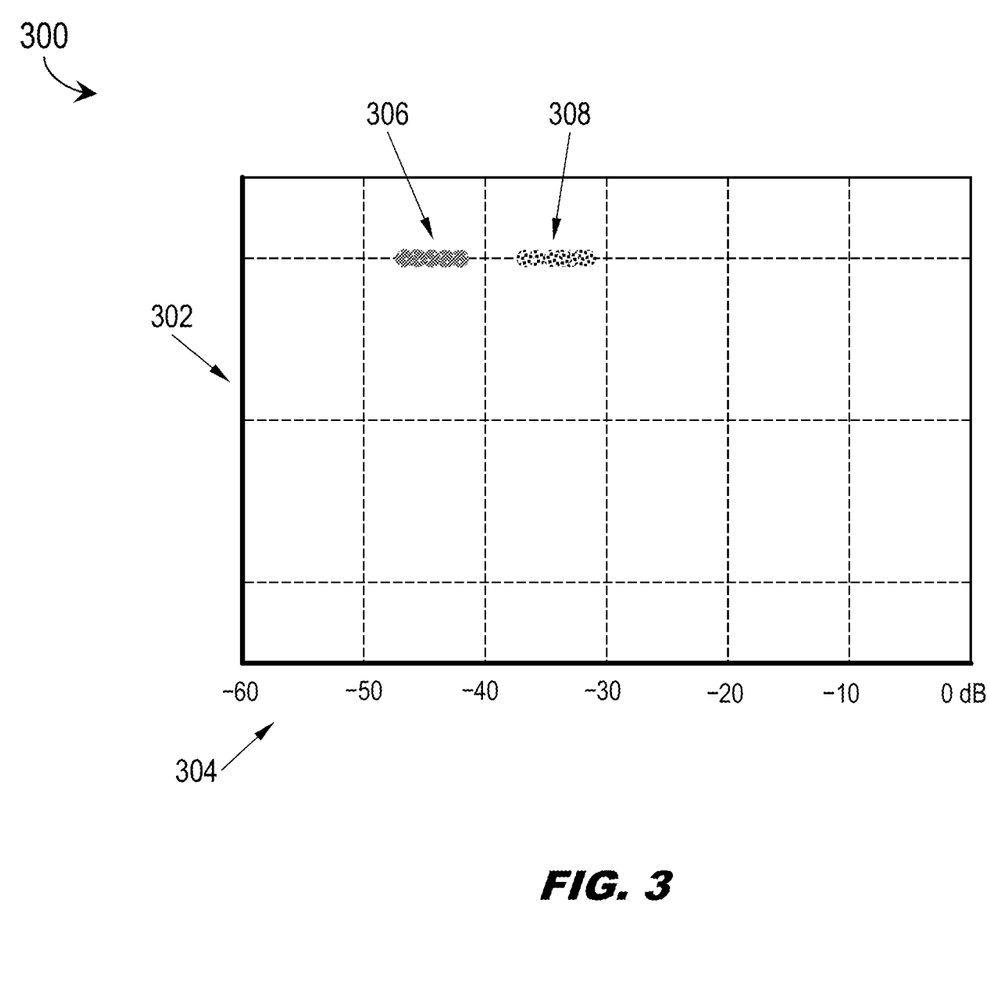
FIG. 3 is a graphic representation of a probability distribution function (PDF) of energy detected by the energy sensing operations of FIGS. 3A and 3B.

Referring now to FIG. 3, the probability distribution function 300 (PDF) may correlate the interference levels identified by processing of the collected energy samples to determine whether the interference is due to acceptable noise or associated with an interfering signal. For example, in the former case the control processors (112/114, FIG. 1) may hypothesize that the sensed frequency is usable due to a tolerable level of detected interference; in the latter case, the interfering signal may render the interference level intolerable and the sensed frequency unusable within the region or area corresponding to the sensing ARS 102/GRS 104.

In embodiments, the PDF 300 may plot the detected energy level of collected spectral energy samples (y-axis 302) normalized to dB (x-axis 304), as noted above. (It should be noted that the dB range reflected by the x-axis 304 may vary according to the CNPC waveform, and are not limited to the {−60 dB, 0 dB} range shown by FIG. 3.) For example, the CNPC waveforms used by the CNPC transceiver 108 may incorporate constant-envelope modulation; accordingly, any symbols transmitted via CNPC waveform may be associated with a constant energy level. A distribution of energy levels 306 grouped around a lower energy level may be associated with a tolerable noise-plus-interference energy level (e.g., normal ambient noise plus a tolerable level of interference energy), while a distribution of energy levels 308 encroaching upon the CNPC constant envelope energy range may clearly indicate an interfering CNPC signal precluding current use of the sensed frequency in the vicinity of the sensing ARS 102/GRS 104.

In embodiments, the origins of the interfering CNPC signal, e.g., whether or not the CNPC signal is associated with the C2 link system (100, FIG. 1) or with a competing C2 link system, may be determined by server fusion performed by the centralized spectrum arbitrator 116. Similarly, the presence of an interfering non-constant-envelope signal may require additional fused data (e.g., minimum and mean energy levels and standard deviations therefrom) and may be left to the centralized spectrum arbitrator 116.

Figure 4A:
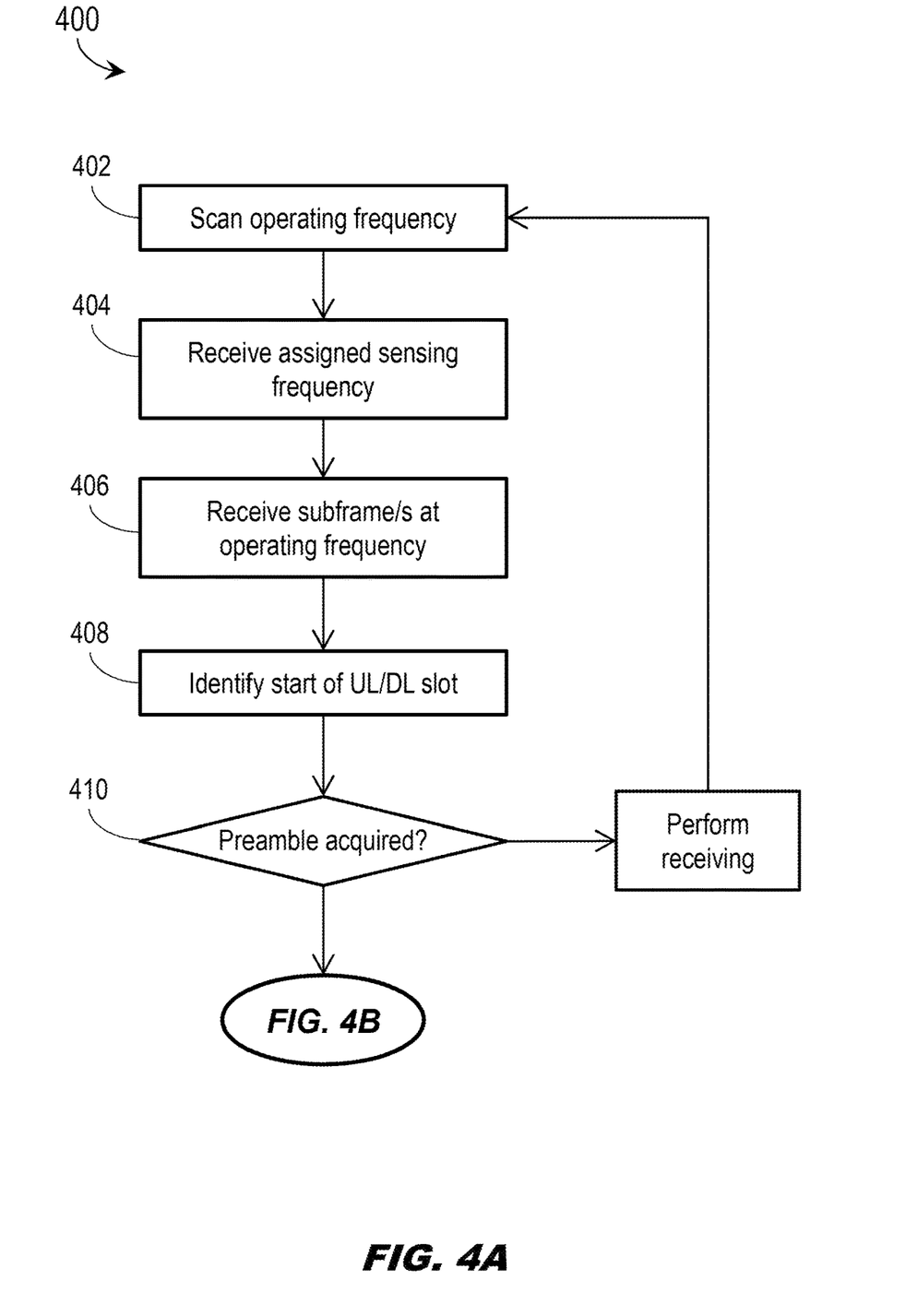
FIGS. 4A and 4B are process flow diagrams illustrating a method for same-channel out of band sensing according to with example embodiments of this disclosure.

Referring now to FIG. 4A, the method 400 may be implemented by an ARS or GRS of the C2 link system, and may include the following steps.

At a step 402, a C2 radio system (e.g., either an ARS or GRS of the C2 link system) scans operating frequencies (e.g., broadcast frequencies) via which the ARS listens for uplink transmissions and the GRS listens for downlink transmissions.

At a step 404, the ARS/GRS receives an assigned sensing frequency from a centralized spectrum arbitrator of the C2 link system.

At a step 406, the ARS/GRS receives subframes at the operating frequency, each subframe having an uplink portion and a downlink portion.

At a step 408, the ARS/GRS identifies the start of an uplink or downlink slot within the received subframe.

At a step 410, the ARS/GRS attempts to acquire a preamble associated with normal reception of a C2 transmission. If the preamble is acquired, the ARS/GRS proceeds with normal reception of an incoming C2 message and continues scanning the operating frequency.

Figure 4B:
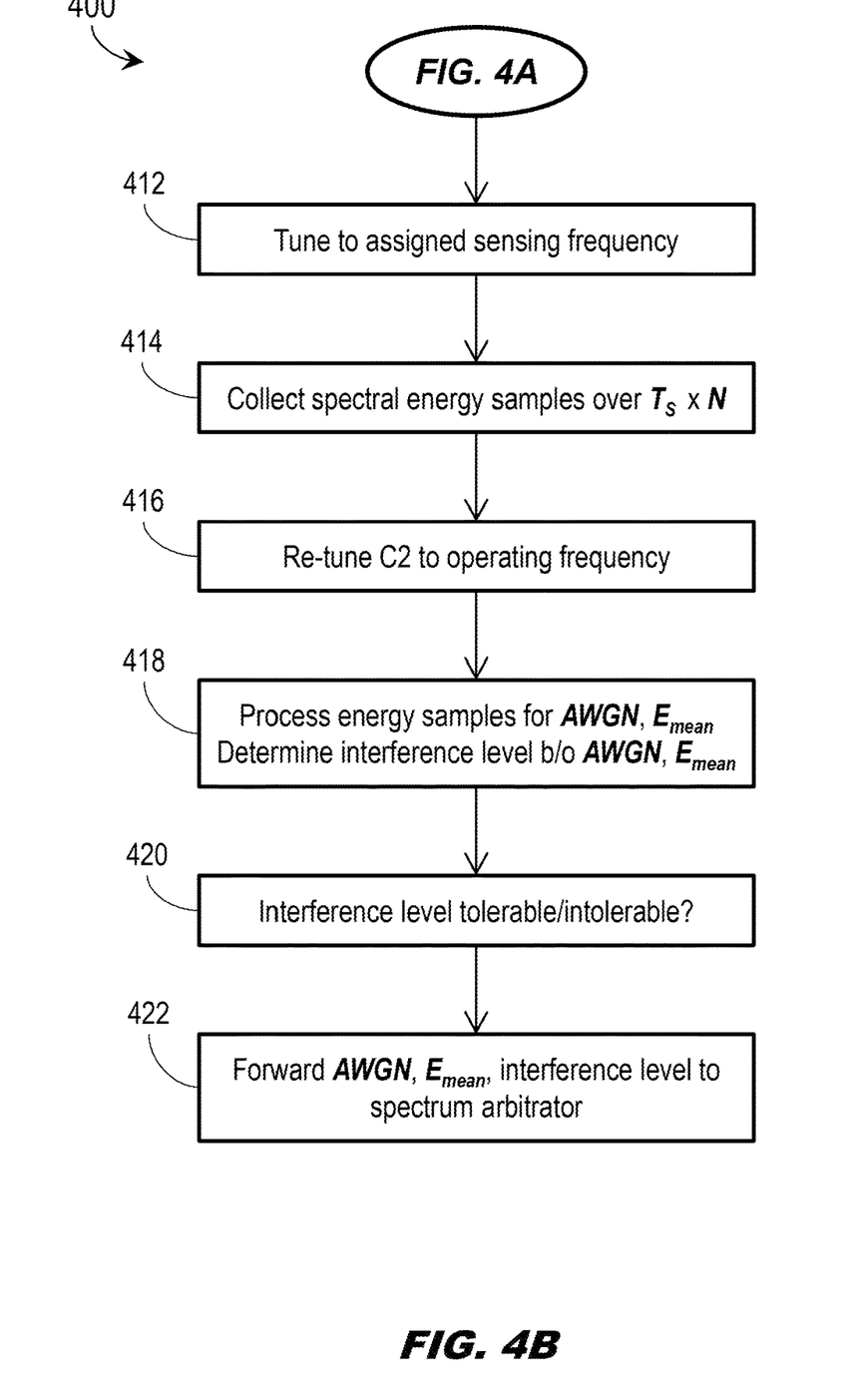

Referring also to FIG. 4B, at a step 412, if the preamble is not acquired, the ARS/GRS tunes to the assigned sensing frequency and commences same-channel out-of-band sensing operations.

At a step 414, the ARS/GRS collects N spectral energy samples at the assigned sensing frequency, each spectral energy sample over a sample period $T_s$.

At a step 416, the ARS/GRS returns to the appropriate operating frequency once the N spectral energy samples are collected.

At a step 418, the ARS/GRS processes the collected energy samples to calculate at least a noise floor $E_{min}$ and a mean energy level $E_{mean}$. For example, based on the detected noise floor and mean energy level, the ARS/GRS calculates an interference level at the assigned sensed frequency.

At a step 420, the ARS/GRS designates the calculated interference level as either tolerable (e.g., acceptable noise+interference) or intolerable (e.g., due to an interfering CNPC signal).

The method 400 may include an additional step 422. At the step 422, the ARS/GRS forwards the collected energy samples, calculated energy levels, and interference level designations to the centralized spectrum arbitrator.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A command and control (C2) communications device, comprising:
    at least one radio modem configured to select at least one operating frequency from a plurality of one or more frequencies;
    at least one receiver operatively coupled to the radio modem, the receiver configured to:
        receive at least one subframe transmitted by a C2 source by scanning the at least one operating frequency, the subframe having an uplink portion and a downlink portion;
        identify at least one slot within the at least one subframe;
        determine whether the at least one slot includes an acquired preamble;
        if the at least one slot does not include the acquired preamble, direct the radio modem to switch the receiver to at least one assigned sensing frequency;
        collect a set of N energy samples corresponding to the assigned sensing frequency, each energy sample associated with a sample period $T_s$, where N is an integer;
        and
        direct the radio modem to switch the receiver back to the operating frequency upon collection of the set;
    and
    at least one processor configured to:
        determine, by processing the set of N energy samples, at least a noise floor and a mean energy level corresponding to the assigned sensing frequency;
        and
        identify, based on at least the noise floor and the mean energy level, an interference level corresponding to the assigned sensing frequency.

2. The C2 communications device of claim 1, wherein:
    the communications device is an air radio system (ARS) embodied in an unmanned aircraft system (UAS);
    the at least one slot is an uplink slot;
    and the C2 source is a ground radio system (GRS).

3. The C2 communications device of claim 1, wherein:
    the communications device is a GRS;
    the at least one slot is a downlink slot;
    and the C2 source is an ARS embodied in a UAS.

4. The C2 communications device of claim 1, wherein:
    the at least one assigned sensing frequency is received from a spectrum arbitrator communicatively coupled with the communications device;

and the at least one receiver is configured to forward one or more of the noise floor, and the mean energy level to the spectrum arbitrator.

5. The C2 communications device of claim 1, wherein:
the at least one processor is configured to designate the interference level as either tolerable or intolerable;
and
the at least one receiver is configured to forward the designation to the spectrum arbitrator.

6. The C2 communications device of claim 1, wherein:
the subframe includes a guard time associated with the end of the subframe;
and
the processor is configured to select N and $T_s$ such that a time window ($N \times T_s$) during which the set is collected elapses before the guard time.

7. The C2 communications device of claim 1, wherein:
the at least one processor is configured to determine, by processing the set of N energy samples, one or more of:
a standard deviation from the noise floor;
and
a standard deviation from the mean energy level.

8. The C2 communications device of claim 7, wherein:
the at least one processor is configured to identify at least one interfering signal associated with the interference level, the interfering signal selected from a constant-envelope signal and a non-constant-envelope signal.

9. A method for same-channel out-of-band spectrum sensing, the method comprising:
configuring a command and control (C2) radio system to scan at least one operating frequency;
receiving at least one assigned sensing frequency from a spectrum arbitrator;
receiving at least one subframe transmitted by a C2 source by scanning the operating frequency, the subframe having an uplink portion and a downlink portion;
identifying at least one slot within the subframe;
determining whether the slot includes an acquired preamble;
if the at least one slot does not include an acquired preamble, switching the C2 radio system to the assigned sensing frequency;
collecting a set of N energy samples corresponding to the assigned sensing frequency, each energy sample associated with a sample period $T_s$, where N is an integer;
returning the C2 radio system to the operating frequency upon collection of the set of energy samples;
identifying, by processing the set of N energy samples, one or more of a noise floor, a mean energy level, and an interference level corresponding to the assigned sensing frequency;
and
designating the interference level as either tolerable or intolerable.

10. The method of claim 9, further comprising:
forwarding one or more of the noise floor, the mean energy level, the interference level, and the designation to the spectrum arbitrator.

11. The method of claim 9, wherein:
configuring a command and control (C2) radio system to scan at least one operating frequency includes configuring an air radio system (ARS) embodied in an unmanned aircraft system (UAS) to scan at least one operating frequency;
and
identifying at least one slot within the subframe includes identifying at least one uplink slot within the subframe.

12. The method of claim 9, wherein:
configuring a command and control (C2) radio system to scan at least one operating frequency includes configuring a ground radio system (GRS) to scan at least one operating frequency;
and
identifying at least one slot within the subframe includes identifying at least one downlink slot within the subframe.

13. The method of claim 9, wherein:
identifying, by processing the set of N energy samples, one or more of a noise floor, a mean energy level, and an interference level corresponding to the assigned sensing frequency includes:
identifying, by processing the set of N energy samples, one or more of a standard deviation from the noise floor and a standard deviation from the mean energy level.

14. The method of claim 9, wherein collecting a set of N energy samples corresponding to the assigned sensing frequency, each energy sample associated with a sample period Ts, where N is an integer includes:
selecting N and $T_s$ such that a time window ($N \times T_s$) during which the set is collected elapses before the guard time.

15. The method of claim 9, wherein identifying, by processing the set of N energy samples, one or more of a noise floor, a mean energy level, and an interference level corresponding to the assigned sensing frequency includes:
identifying at least one interfering signal associated with the interference level.

\* \* \* \* \*